Jan. 7, 1936.　　　　E. E. FOSTER　　　　2,027,275
MECHANICAL MOVEMENT
Filed Aug. 27, 1934　　　　2 Sheets-Sheet 2
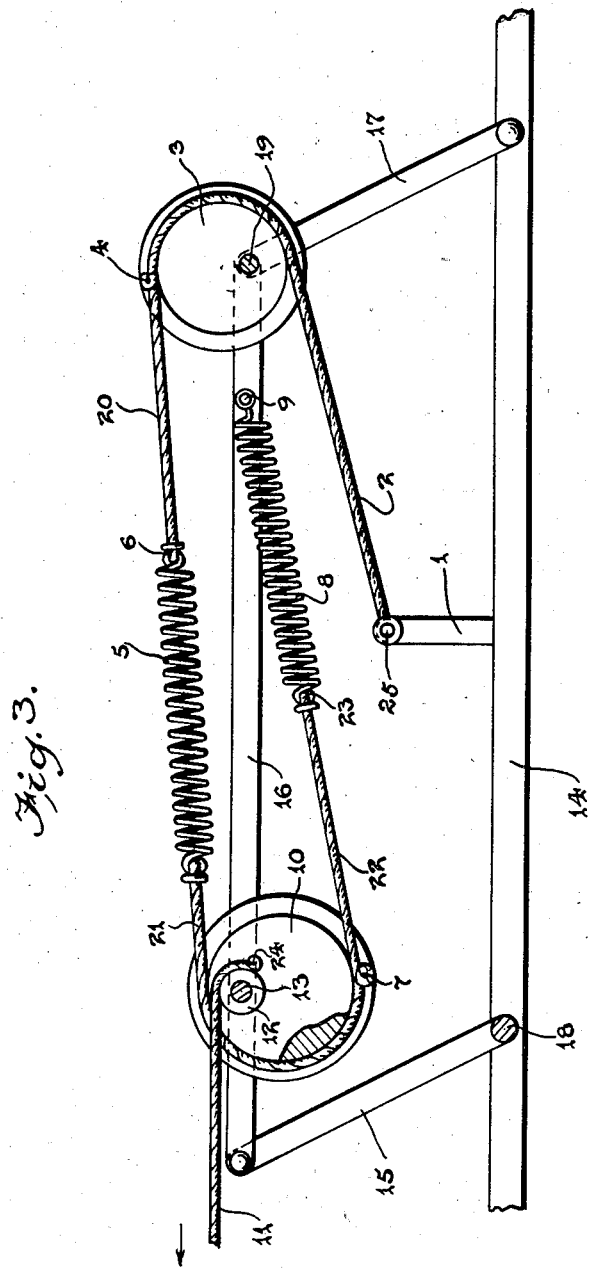
Inventor
Edwin E. Foster,
By　Emil Bonnelycke
Attorney Patented Jan. 7, 1936

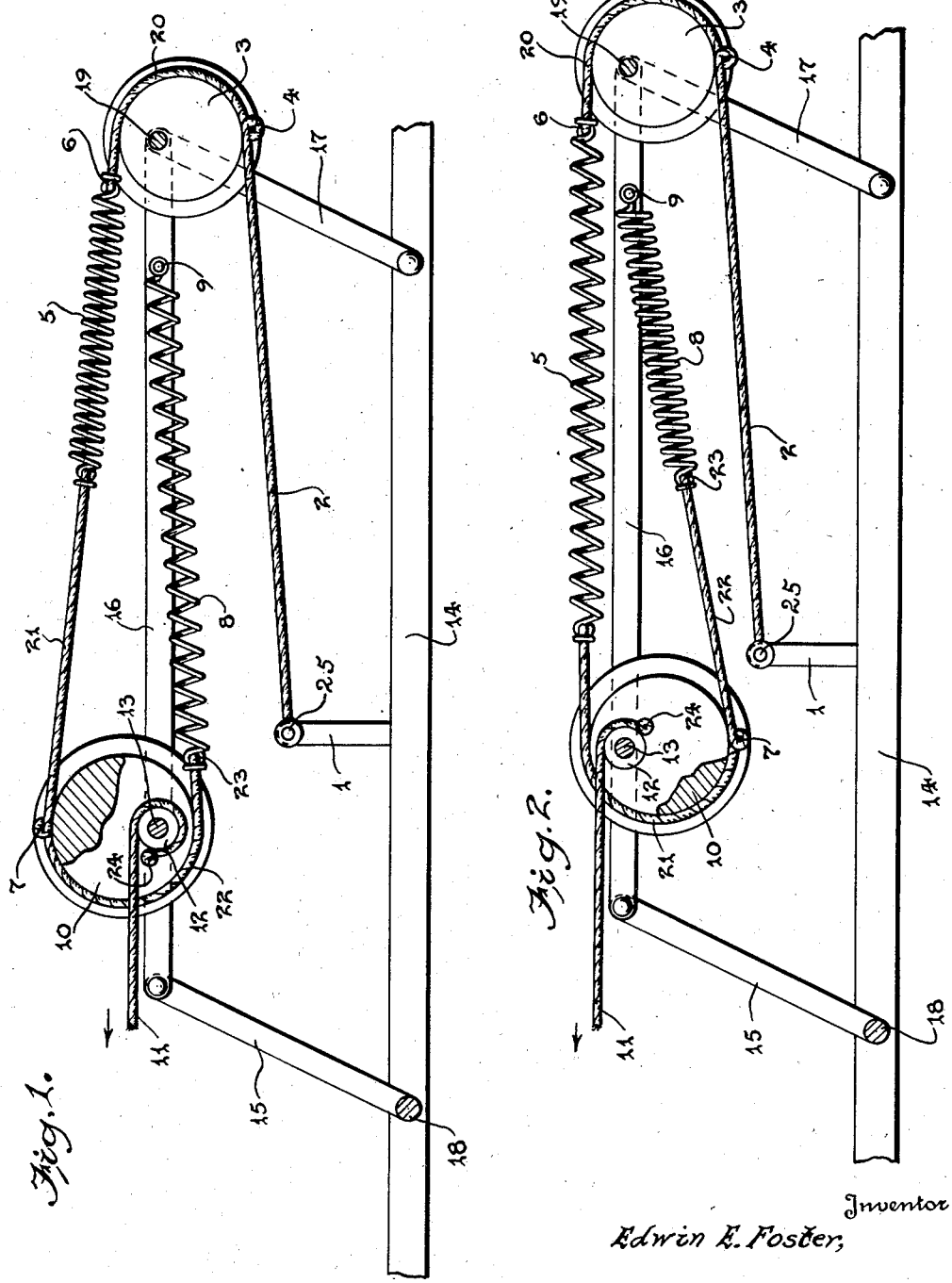

2,027,275

UNITED STATES PATENT OFFICE 2,027,275

MECHANICAL MOVEMENT

Edwin E. Foster, Austin, Tex.

Application August 27, 1934, Serial No. 741,664

10 Claims. (Cl. 74—95)

This invention relates to a mechanical movement applicable to many different types of mechanisms. The object of the invention is to provide a mechanical movement to render it possible to apply a slight force or pressure to a movable element, lever, pedal, rod, wheel, etc. to accomplish a mechanical operation, and, as the force or pressure of operation becomes greater or remains constant, the device will tend to increase its ability to deliver force or pressure so that during the entire cycle of operation of the movable element the force or pressure necessary for operation will be counterbalanced or constant throughout. In other words, the device tends to counterbalance the increasing or constant force or pressure of a moving element or elements so that during the entire mechanical operation the manual force necessary to accomplish the result desired remains constant at approximately the same pressure or force necessary to carry out the first part of the operation or movement.

It is a further object of the invention to provide a simple structure which originally stores the energy necessary to carry out an increasing or constant force or pressure in accomplishing a mechanical operation.

The device is particularly applicable in operating clutch and brake pedals for motor vehicles, in assisting in the movement of heavy objects, the movement or placement of objects to a desired point or place and their return, for counterbalancing the action of a return spring or the force of a spring in general, etc. In connection with the operation of a clutch pedal, for instance, a mechanical movement according to the present invention renders it possible to reduce the entire pressure of operation to a minimum without sacrificing the control which the operator has or needs over the vehicle or its operation. Also the mechanical movement is applicable to ironing machines of all types to counterbalance the weight of the iron or head of a laundry machine or presser so that very little manual labor is necessary in lowering and raising an iron or the head of a laundry machine.

Other objects will be apparent from the following description taken in connection with the accompanying drawings, in which:

Figure 1 is a diagrammatic side view of the mechanical movement showing the parts or elements at rest or at the beginning of operation, in which the energy is stored in one spring, Fig. 2 is a similar view showing the parts just before the working stroke in which the energy has been transferred to the other spring, and Fig. 3 is a similar view showing the completion of the power stroke.

For purpose of illustration the mechanical movement is mounted on and forms a part of a movable frame member or a four bar linkage 14, 15, 16 and 17, of which the member 14 is stationary. An arm 1 is fixed to the member or bar 14 and to which one end of a cable 2 is secured at 25. The other end of the cable 2 is secured at 4 to the periphery of an eccentrically mounted wheel or pulley 3. The pulley 3 is rotatably mounted on an axle 19 at the meeting or pivot point of the bars 16 and 17. At the point 4 on the pulley 3 another cable 20, or the same cable 2, is secured which has the other end 6 secured to one end of a spring 5. The other end of the spring 5 is secured to another cable 21 which passes around, depending upon the position of the parts of the mechanical movement, and is secured to the periphery of the eccentrically mounted pulley 10 at 7. This cable 21, or another section of cable 22, passes from the point 7 to one end of a second spring 8 at 23. The spring 8 is secured at the other end to the bar 16 at 9. Both springs 8 and 5 are tension springs which will be more fully described in the operation of the device.

The pulley 10 is eccentrically mounted on a pivot or axle 13 on the bar 16. Furthermore, on the axle 13 and secured to and rotating with the pulley 10 is an auxiliary or small pulley 12 around which a cable 11 is capable of being wound. One end of the cable 11 is secured to the pulley 12 at 24.

If, for instance, single lengths of cable are used attached to the springs instead of a number, the cables must be secured to the periphery of the pulleys at 4 and 7.

The operation of the device is as follows:

In normal position the various elements are shown as indicated in Fig. 1. The spring 8 is under tension or in other words it has energy stored therein. The spring 8 is pulling, by means of cable 22, against a short lever arm, due to the position of the pulley 10 on its axle 13. The spring 5 which is slightly under tension is pulling against a long lever arm, the long lever arm being theoretically considered as a line passing from the center of the axle 13 upwardly to the periphery of the pulley and the short lever arm by a line passing down from the center of the axle to the periphery of the pulley 10.

The other end of spring 8 is pulling on bar 16 at 9, to which it is attached, and at 6 the spring 5 is pulling around the eccentrically mounted pulley 3. The four bar linkage is maintained stationary, that is from collapsing toward the right, Fig. 1, due to the cable 2 which is secured to the stationary arm 1.

When the control cable 11 is pulled in the direction of the arrow, which pull is rather slight, the pulley 10 will be rotated counter-clockwise approximately one-half of a revolution so that the various elements change their positions from those shown in Fig. 1 into those shown in Fig. 2. In such position the energy stored in spring 8 is changed over into the spring 5 so that the latter is tensioned and spring 8 assumes a compressed appearance. It will be noted that while in Fig. 1 the cable 22 contacts approximately one-half of the periphery of the pulley 10, the cable 21 in the new position contacts approximately one-half the periphery of the pulley, the cables 20 and 2 and the pulley 3 remaining practically unchanged relative to these elements to each other.

In the further operation of the mechanical movement, assuming that a slight pull is still being exerted on the cable 11, the tension in the spring 5 will now cause the pulley 3 to rotate counter-clockwise approximately one-half a revolution thereby causing the elements to assume the positions shown in Fig. 3. In the latter position of the mechanical movement the power stroke has been exerted on the bar 15 causing a rotation in the shaft 18, to the latter of which is attached the element or elements, the force or pressure of which is to be counterbalanced. It will be noted in Fig. 3, that the pulley 3 has rotated approximately one-half of a revolution and the four bar linkage has shifted toward the left, the bar 14 of course being stationary at all times. Also the spring 5 has assumed a compressed appearance since the energy stored therein from spring 8 has been transformed into work by rotating shaft 18 to counterbalance the force or pressure desired.

To return the parts to the original or normal position as shown in Fig. 1 the slight tension on cable 11 is released and the operation is reversed, that is the energy stored in the cooperating parts, not shown, of shaft 18 restore such energy back into spring 5 and from there into spring 8.

The amount of eccentricity of the pulleys 3 and 10 and the shapes thereof are matters of design depending upon the forces and pressures to be dealt with and the specific type of machine with which the mechanical movement is used. Also the eccentrically mounted pulleys 3 and 10 and particularly pulley 3 can be egg-shaped or may have any other irregular periphery to adapt the device for any specific operation where the force is to be increased and for other conditions. The cable 11 can also be dispensed with as a shaft, not shown, or axle 13 can be employed to rotate the small pulley 12.

It is also possible to construct the movement so that the cables 2, 20, 21, and 22 may be composed of the material of the springs with the temper removed by elongations on the springs.

I claim as my invention:

1. A mechanical movement comprising a movable frame member, a pair of pulleys eccentrically mounted on the frame member, a cable system for the pulleys, a pair of springs mounted in said cable system, one spring in the normal position being under considerable tension and the other under slight tension, and means for rotating one of said pulleys to transfer the energy in the considerably tensioned spring into the slightly tensioned spring to perform a working stroke by utilizing the energy in the last-mentioned spring.

2. A mechanical movement according to claim 1, in which the movable frame member is in the form of a four bar linkage of which one bar is stationary.

3. A mechanical movement according to claim 1, in which the means includes a small pulley mounted on one of the eccentrically mounted pulleys and provided with a cable which when sufficient force is applied thereto the eccentrically mounted pulley will be rotated.

4. A mechanical movement comprising a movable frame member, a pair of pulleys eccentrically and rotatably mounted on said frame member, a pair of springs, one spring in the normal position being under considerable tension and the other under slight tension, means for connecting the springs to the pulleys, and means for rotating one of said pulleys to transfer the energy in the considerably tensioned spring into the slightly tensioned spring to perform a working stroke by utilizing the energy in the last-mentioned spring.

5. A mechanical movement comprising a movable frame, a pair of pulleys eccentrically and rotatably mounted on the frame member, a pair of springs cooperating with said pulleys and one spring being under tension in the normal position and means for rotating one of said pulleys to transfer the energy in the tensioned spring to the other spring to perform a working stroke by utilizing the energy in the last-mentioned spring.

6. A mechanical movement according to claim 5, in which the means includes a small pulley mounted to rotate with one of the eccentrically mounted pulleys and provided with means which when sufficient force is applied thereto the last-mentioned eccentrically mounted pulley will be rotated to transfer the energy from the tensioned spring to the other spring.

7. A mechanical movement comprising a pair of bars pivotally mounted at one end, a third bar pivotally mounted on the other ends of the pair of bars, a pair of pulleys eccentrically and rotatably mounted on the bars, a pair of springs, a cable connected to the springs and to and around the pulleys, one spring being under considerable tension and the other under slight tension in the normal position, and means for rotating one of said pulleys to transfer the energy in the tensioned spring to the other spring to perform a working stroke by utilizing the energy in the last-mentioned spring.

8. A mechanical movement according to claim 10, in which the means includes a small pulley mounted to rotate with one of the eccentrically mounted pulleys and provided with a cable secured to the periphery of the small pulley which when sufficient force is applied thereto the small pulley and the pulley to which it is secured will be rotated to transfer the energy from the considerably tensioned spring to the slightly tensioned spring.

9. A mechanical movement according to claim 7, in which one end of the cable is mounted at a stationary point and one spring is mounted at one end to the other end of the cable and the other end to the third bar, and in which the other spring is mounted at both ends to the cable.

10. A mechanical movement according to claim 7, in which one pulley is mounted on the third bar and the other pulley is mounted at the pivot point of one end of the third bar.

EDWIN E. FOSTER.

CERTIFICATE OF CORRECTION.

Patent No. 2,027,275. January 7, 1936.

EDWIN E. FOSTER.

It is hereby certified that error appears in the printed specification of the above numbered patent requiring correction as follows: Page 2, second column, line 52, claim 8, for the numeral "10" read 7; and that the said Letters Patent should be read with this correction therein that the same may conform to the record of the case in the Patent Office.

Signed and sealed this 11th day of February, A. D. 1936.

(Seal)

Leslie Frazer
Acting Commissioner of Patents.